UNITED STATES PATENT OFFICE.

WILLIAM G. WEY, OF BARBERTON, OHIO, ASSIGNOR TO THE DIAMOND MATCH COMPANY, OF CHICAGO, ILLINOIS, A CORPORATION OF ILLINOIS.

COMPOSITION FOR IMPARTING FLAMING AND NON-GLOWING PROPERTIES TO MATCH-SPLINTS.

1,191,544. Specification of Letters Patent. Patented July 18, 1916.

No Drawing. Application filed November 7, 1912. Serial No. 729,971.

*To all whom it may concern:*

Be it known that I, WILLIAM G. WEY, a citizen of the United States, and resident of Barberton, in the county of Summit and State of Ohio, have invented certain new and useful Improvements in Composition for Imparting Flaming and Non-Glowing Properties to Match-Splints, of which the following is a specification.

This invention relates to a composition for treating match splints, whereby the splints are economically and efficiently impregnated with a material or materials adapted to aid the transmission of the flame from the match-head composition to the splints, and with a material or materials adapted to render the splints non-glowing after they have been ignited and extinguished.

The main object of my invention is to provide a composition in which an organic material, which is adapted to impart the flaming property to the splints, has incorporated therewith an inorganic material in solution, which is adapted to impart the non-glowing property to the splints.

In carrying out my invention in a simple, efficient and economical manner, I select an inorganic material having the requisite characteristics; dissolve it in an unctuous substance, miscible with melted paraffin wax, or other analogous substance, and then incorporate the mixture with such wax or substance.

The preferred inorganic material which I employ is orthophosphoric acid ($H_3PO_4$), and the preferred substance in which it is dissolved is cottonseed oil; the mixture being prepared in any suitable manner. Thus, for example, a saturated solution of orhtophosphoric acid in cottonseed oil is prepared by adding five per centum of the acid to the oil, agitating the mixture at frequent intervals, and then allowing the mixture to stand about twelve hours. A certain proportion of the acid will not dissolve in the oil, and, upon being allowed to stand, will settle to the bottom, with the mixture of oil and acid floating on top. The supernatant liquid of oil containing orthophosphoric acid is carefully poured off and added to melted paraffin wax, in the proportion of fifteen per cent. by volume of the acid and oil mixture to 85 per cent. of the said wax. Match splints dipped into this solution maintained at a temperature of about 275° Fahr., and then removed, possess the inflammable properties ordinarily given by paraffin wax, and also the non-glowing properties ordinarily imparted by a separate solution of boracic acid, or other inorganic materials having a similar action on the splints.

My invention contemplates a composition in which the unctuous solvent for the inorganic material constitutes the flame-transmitting vehicle. In that case, for example, the inorganic material may comprise orthophosphoric acid, and the solvent therefor be cottonseed oil; the mixture being prepared in any suitable manner. Thus, a saturated solution of orthophosphric acid in cottonseed oil is prepared by adding about two per cent. of the acid to the oil, agitating the mixture frequently, and then allowing the mixture to stand until the oil has taken up all the acid. If match splints be dipped in the resulting solution they will become impregnated with both ingredients and thus possess the desired flaming and non-glowing properties.

It is to be understood that I do not limit my invention to the specific organic and inorganic materials herein described; nor to the specific illustrative mode or modes of preparing my improved composition or mixture; as other organic and inorganic materials and other methods of preparation may be employed without departure from the fair spirit of my invention.

The impregnation of match splits, and the product produced thereby is not claimed in the present application, but in my copending application, Serial Number 51,950, filed September 22, 1915.

I claim—

1. Composition for imparting flaming and non-glowing properties to match splints treated therewith, said composition comprising an organic substance and an inorganic material in solution therein, the former serving as a vehicle to transmit the flame from the igniting material to the body of the splint and the latter being capable of rendering the splints non-glowing after the flame has been extinguished.

2. Composition for imparting flaming and non-glowing properties to match splints treated therewith, said composition comprising an inflammable organic substance having incorporated therewith a solution of an inorganic material in an unctuous substance, the said material being of a character capable of imparting a non-glowing property to the splints and the said unctuous substance being miscible with the said inflammable organic substance.

3. Composition for imparting flaming and non-glowing properties to match splints treated therewith, said composition comprising an unctuous inflammable substance and an inorganic anti-glowing material in solution therein.

4. Composition for imparting flaming and non-glowing properties to match splints treated therewith, said composition comprising melted paraffin wax with which is incorporated a solution of an inorganic material in an unctuous substance, said material being of a character to impart the non-glowing property to the splints and the said unctuous substance being inflammable.

5. Composition for imparting flaming and non-glowing properties to match splints treated therewith, said composition comprising paraffin wax having incorporated therewith a solution of an inorganic material in an unctuous substance, the said material being of a character to impart the non-glowing property to the splints and the said unctuous substance being miscible with melted paraffin wax.

6. Composition for imparting flaming and non-glowing properties to match splints treated therewith, said composition comprising paraffin wax having incorporated therewith a solution of an inorganic material in cottonseed oil, the said material being of a character to impart the non-glowing property to the splints.

7. Composition for imparting flaming and non-glowing properties to match splints treated therewith, said composition comprising paraffin wax having incorporated therewith a solution of orthophosphoric acid in oil.

8. Composition for imparting flaming and non-glowing properties to match splints treated therewith, said composition comprising paraffin wax having incorporated therewith a solution of orthophosphoric acid in cottonseed oil.

9. Composition for imparting flaming and non-glowing properties to match splints treated therewith, said composition comprising paraffin wax having incorporated therewith a solution of orthophosphoric acid and cottonseed oil in the proportion of about fifteen per cent. by volume of said solution to melted paraffin wax.

Signed at Barberton, in the county of Summit and State of Ohio this fourth day of November A. D. 1912.

WILLIAM G. WEY.

Witnesses:
E. A. JACOBS,
SABINA PARKS.